Jan. 3, 1961
Z. G. JIGAMIAN
2,966,841
DEVICE FOR SUPPORTING AND ROTATING
FRANKFURTERS DURING COOKING
Filed Nov. 1, 1957
2 Sheets-Sheet 1
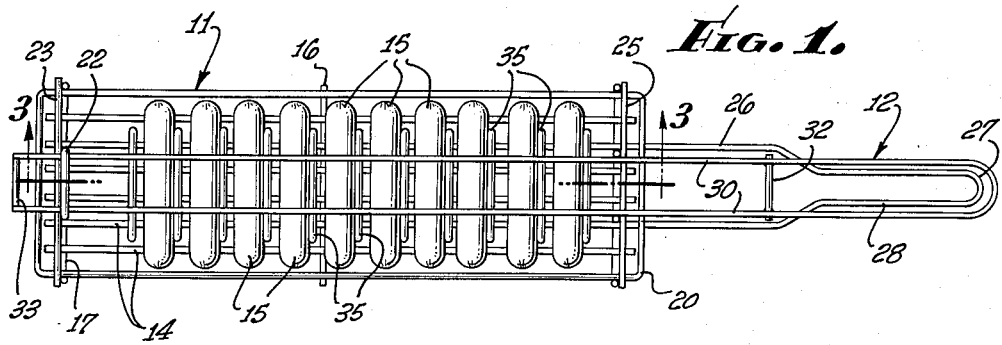
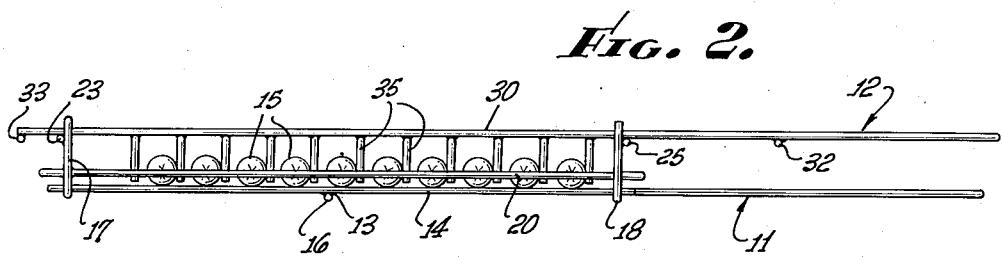
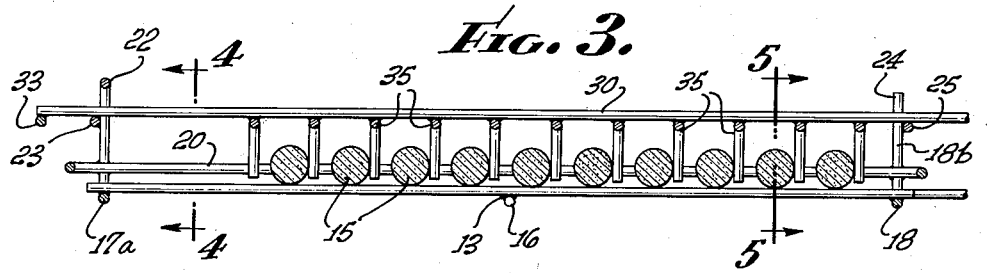
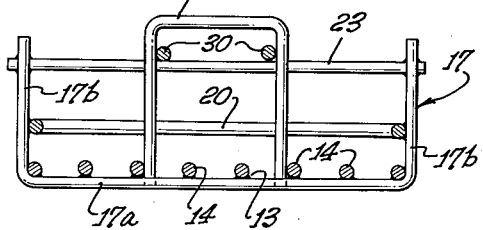
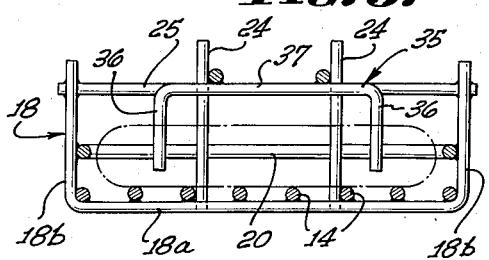
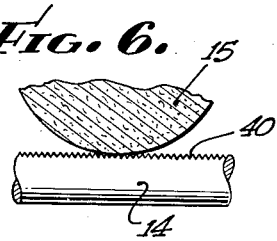
ZAREH G. JIGAMIAN,
INVENTOR.
BY
*Mason & Graham*
ATTORNEYS.

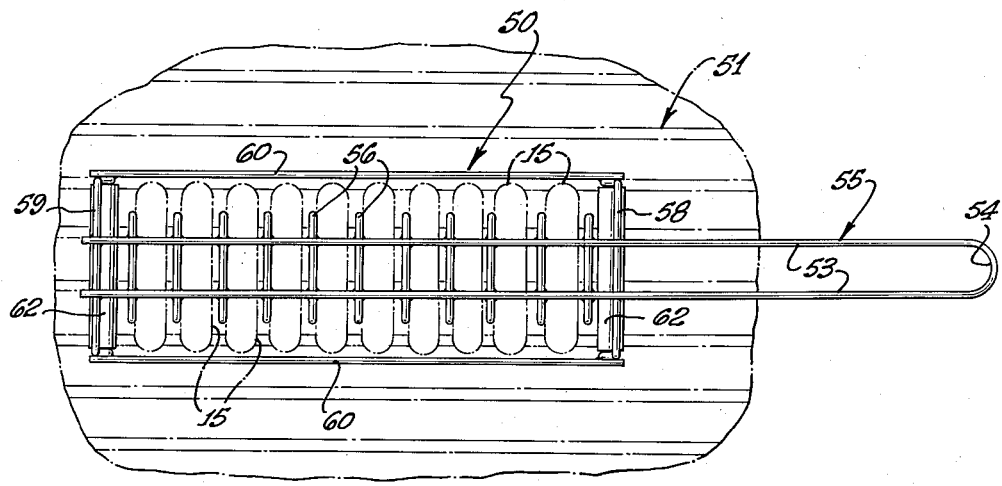
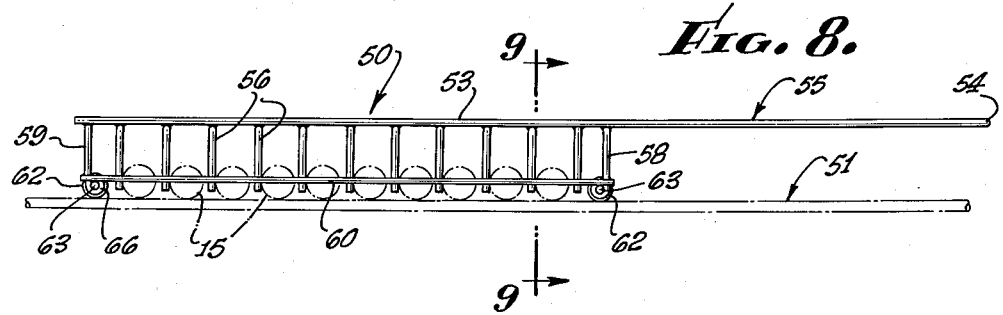
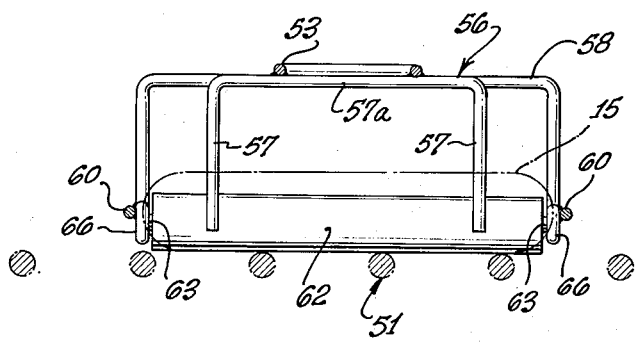

United States Patent Office 2,966,841
Patented Jan. 3, 1961

2,966,841

DEVICE FOR SUPPORTING AND ROTATING FRANKFURTERS DURING COOKING

Zareh G. Jigamian, 916 W. 77th St., Los Angeles, Calif.

Filed Nov. 1, 1957, Ser. No. 693,935

1 Claim. (Cl. 99—441)

This invention has to do generally with means for supporting and turning articles of food of a generally cylindrical shape, such as frankfurters and wieners, while being cooked over a source of heat.

Although it is common practice to cook frankfurters and the like in hot water, it is often desirable to cook them in other ways, such as by broiling or by barbecuing over an open bed of coals. However, the difficulty with this has been the lack of a simple means for supporting the frankfurters and turning them as they cook so as to insure their cooking evenly.

It therefore is an object of my invention to provide novel means for supporting articles of food of a generally cylindrical character, such as frankfurters, for example, together with means for rotating or turning the articles of food so as to insure even cooking thereof.

It is a particular object to provide novel means of the type indicated for supporting frankfurters or the like in a common plane in laterally spaced relation together with novel means for rotating or rolling the frankfurters back and forth in said plane.

Still another object is to provide a simple device of the type indicated which may be readily held in the hand and operated by a person or may be placed on a support over a fire or source of heat.

More particularly it is an object to provide a simple, two-piece device which consists essentially of a basket for holding the articles of food and a reciprocable rake member by means of which the articles may be rolled back and forth.

A further object is to provide a novel rake member for rotating and restraining cylindrical food articles placed directly upon a grill or the like.

Still another object is to provide a simply constructed device which can be economically manufactured.

These and other objects will be apparent from the drawing and the following description. Referring to the drawing:

Fig. 1 is a plan view of a device embodying the invention;

Fig. 2 is a side elevational view of the device of Fig. 1;

Fig. 3 is a sectional view on line 3—3 of Fig. 1;

Figs. 4 and 5 are enlarged sectional views on lines 4—4 and 5—5, respectively, of Fig. 3;

Fig. 6 is an enlarged fragmentary view of a portion of a food-supporting rod;

Fig. 7 is a plan view of another form of the invention;

Fig. 8 is a side elevational view of the device of Fig. 7; and,

Fig. 9 is a sectional view on line 9—9 of Fig. 8, but on a larger scale.

More particularly describing the invention, 11 generally indicates a container which may be said to be in the form of a shallow basket, and numeral 12 designates generally a rake member which is carried by the basket and may be reciprocated relative thereto.

The basket in the form in which it is shown is made up of wire or wire rod material and includes a floor which comprises a plurality of laterally spaced food article-supporting rods 14 which extend longitudinally of the basket and upon which the articles of food, such as frankfurters 15, are placed. The rods 14 are attached, as by welds 13, to a centrally disposed cross rod 16 and, similarly, to a pair of generally U-shaped end members 17 and 18. The latter include a base or bottom portion 17a, 18a, respectively, and a pair of upright side elements 17b, 18b, respectively. A food article-retaining member, designated 20, extends around the basket forming a side wall portion at an elevation somewhat less than half the height of the members 17 and 18. Preferably the member 20 is located at a height above the top of the rods 14 which is approximately equal to half the diameter of the articles of food to be cooked.

At one end the basket is provided with a rake guide member 22 which is of inverted square U-shape and this is welded or otherwise secured to end member 17 and to a cross member 23 which in turn is secured to the upright portions 17b of member 17. At the other end of the basket, to guide the rake member I provide a pair of posts, designated 24, which are secured to the end member 18 and to a cross member 25.

The basket member or container 11 is preferably provided with a handle and while any type handle may be provided, for convenience I have shown two of the rods 14 as extending beyond the end of the device to form a handle, designated 26, the rods being connected by a return bend 27 at the end of narrow section 28.

The rake member 12 comprises a pair of bars 30 which are disposed in parallel relation at a spacing such that they may be received between posts 24 at one end of the device and within the member 22 at the other, the rake being supported upon crossbars 23 and 25. Suitable crossbars 32 and 33 are provided between members 30. The bar 32 extends laterally beyond rods 30 to act as an abutment for limiting movement of the rake member as will later appear.

The rake member includes a plurality of prongs or tines disposed in sets 35 and spaced longitudinally along the rack for reception between the articles of food. I show each set of prongs as comprising a pair of depending prongs 36 formed as part of a member 37 which is of inverted U-shape and is welded or otherwise secured to the rods 30. The distance from one end to the other of the sets of prongs is substantially less than the length of the basket to enable the rake member to be moved back and forth.

The spacing of the sets 35 of the prongs is such that ample space is provided between each set for a single frankfurter or the like. In the operation of the device, assuming that the basket member 11 is disposed over a fire or suitable source of heat, reciprocation of the rake member will cause the frankfurters or other food articles to roll or turn upon the bars 14, thereby exposing the entire side surface portion thereof to the source of heat. In order to insure against slippage of the articles of food along the supporting rods 14 without turning, I prefer to provide a frictional roughened surface, designated 40, on the upper surface of each bar and to provide relatively smooth-surface prongs 35. Thus, there is considerably more friction between the bars 14 and the articles of food than there is between the prongs and the articles of food, thereby insuring rotation of the frankfurters or other food articles as the rake member is reciprocated.

It will be apparent that the rake member is removable from the basket, since the end portion of the member opposite to the handle end is slidably received in the rake guide member 22 while the handle end merely rests upon cross member 25 between guide posts 24.

Referring now to Figs. 7, 8, and 9, I show a rake member 50 which is designed to be used directly in conjunction with a food-supporting grill designated 51. In this case, the rake serves not only to provide a means for rotating or rolling the frankfurters or other food articles back and forth, but also as a means for retaining them in a given area or space. Thus the rake 50 is shown comprised of framework which includes two bars or rods 53 connected by a bent section 54. The rods extend the full length of the device providing a handle portion 55. A plurality of prongs or tines located in sets 56 are spaced equally along the rods 53 except in the region of the handle. Each set of prongs comprises two depending tines or prongs 57 and a horizontal connecting section 57a which is welded or otherwise secured to the rods 53. At each end of the main section of the device, I provide an inverted U-shaped end frame member, these being designated 58 and 59. Connecting the members 58 and 59 are a pair of bars 60 which act as a fence to retain the articles of food 15, the bars 60 being located a distance up from the bottom of the device approximately equal to one-half the diameter of an article of food 15. In order to maintain the device at a proper elevation and provide for ease of operation, each end frame carries a roller 62, shown as provided with projecting trunnions 63 received in convolute lower end portions 66 of the frames.

With the articles of food resting directly on the grill, the rake member is so positioned that the sets of prongs extend between the individual articles. Thus, the rake member may be reciprocated directly on the grill to turn the articles as they cook.

Although I have illustrated and described preferred forms of my invention, I contemplate that various changes and modifications can be made therein without departing from the invention, the scope of which is indicated by the following claim.

I claim:

A device for supporting and rotating substantially cylindrical food articles of a given size range during cooking: comprising a shallow wire basket having a floor composed of a plurality of parallel, laterally spaced article-supporting wires disposed in a common plane, said basket further having a pair of end walls and a pair of side walls extending above said floor, said side walls being parallel to said article-supporting wires, a wire rake member comprising spaced main wires extending beyond both end walls of said basket and slidably supported thereon in parallel spaced relation to said floor for movement relative thereto in a direction parallel to the side walls and having parallel sets of prongs secured to said main wires and spaced evenly longitudinally therealong, said prongs extending normal to said main wires toward said floor and terminating short of said floor for reception between articles disposed on the floor of the basket, the spacing of said sets of prongs being so related to the articles as to permit reception of but one article between adjacent sets of prongs, a handle on one end of said rake member, and a handle on said basket for moving one relatively to the other.

References Cited in the file of this patent

UNITED STATES PATENTS

| | | |
|---|---|---|
| 432,168 | O'Neill et al. | July 15, 1890 |
| 476,508 | Barnett | June 7, 1892 |
| 776,777 | Dietz | Dec. 6, 1904 |
| 1,391,269 | O'Brien | Sept. 20, 1921 |
| 2,631,525 | Finizie | Mar. 17, 1953 |
| 2,752,846 | Lucas | July 3, 1956 |
| 2,843,037 | Waas | July 15, 1958 |